(12) United States Patent
Desireddy

(10) Patent No.: US 12,700,810 B2
(45) Date of Patent: Aug. 4, 2026

(54) LOAD INDEPENDENT VOLTAGE AND CURRENT GAIN RESONANT TOPOLOGIES

(71) Applicant: TDK-Lambda Americas Inc., Plano, TX (US)

(72) Inventor: Praveen Desireddy, Neptune, NJ (US)

(73) Assignee: TDK-LAMBDA AMERICAS INC., Plano, TX (US)

( * ) Notice: Subject to any disclaimer, the term of this patent is extended or adjusted under 35 U.S.C. 154(b) by 965 days.

(21) Appl. No.: 17/862,084

(22) Filed: Jul. 11, 2022

(65) Prior Publication Data

US 2024/0014748 A1     Jan. 11, 2024

(51) Int. Cl.
| | |
|---|---|
| *H02M 7/48* | (2007.01) |
| *H02J 7/02* | (2016.01) |
| *H02M 3/335* | (2006.01) |
| *H02M 7/5387* | (2007.01) |

(52) U.S. Cl.
CPC ............. *H02M 7/4815* (2021.05); *H02J 7/02* (2013.01); *H02M 3/33573* (2021.05); *H02M 7/53871* (2013.01)

(58) Field of Classification Search
CPC ........... H02M 7/4815; H02M 3/33573; H02M 7/53871; H02J 7/02
See application file for complete search history.

(56) References Cited

U.S. PATENT DOCUMENTS

| | | | |
|---|---|---|---|
| 9,071,150 B2 | 6/2015 | Zhang et al. | |
| 9,246,409 B2 | 1/2016 | Wu et al. | |
| 9,269,489 B2 * | 2/2016 | Wu .................... | H02M 7/53871 |
| 9,761,370 B2 | 9/2017 | Wu et al. | |
| 9,887,642 B2 | 2/2018 | Safamehr et al. | |
| 10,116,233 B2 | 10/2018 | Chen et al. | |
| 10,188,446 B2 | 1/2019 | Johnson et al. | |
| 10,998,829 B2 | 5/2021 | Nanut | |
| 2012/0262967 A1 * | 10/2012 | Cuk .................... | H02M 7/4807 363/131 |
| 2012/0300504 A1 * | 11/2012 | Ye ..................... | H02M 3/33571 363/21.02 |
| 2013/0265804 A1 * | 10/2013 | Fu ..................... | H02M 3/33576 363/17 |
| 2014/0036545 A1 * | 2/2014 | Reddy .............. | H02M 3/33507 363/17 |

(Continued)

*Primary Examiner* — Yusef A Ahmed
(74) *Attorney, Agent, or Firm* — Stephen Y. Liu; David W. Carstens; Carstens, Allen & Gourley, LLP

(57) ABSTRACT

A resonant converter, apparatus, and method for power conversion. The resonant converter includes an input stage, an output stage, and a resonant network stage that includes at least one inductor and at least one capacitor. The resonant network stage is electrically coupled between the input stage and the output stage and configured to provide a constant current gain at a first operating frequency and a constant voltage gain at a second operating frequency that differs from the first operating frequency. The output stage is configured to be electrically coupled to a load having either a constant current or constant voltage operating mode, or both, and the resonant network provides the constant current, or the constant voltage based on a control signal generated by a frequency modulator for switching between the first operating frequency and the second operating frequency.

11 Claims, 7 Drawing Sheets

(56) References Cited

U.S. PATENT DOCUMENTS

| | | | | |
|---|---|---|---|---|
| 2014/0140113 A1* | 5/2014 | Oh | H02M 1/4241 | 363/89 |
| 2014/0160805 A1* | 6/2014 | Oh | H02M 1/4258 | 363/21.02 |
| 2014/0225439 A1* | 8/2014 | Mao | H02J 50/12 | 307/31 |
| 2014/0307482 A1* | 10/2014 | Chen | H02M 3/3376 | 363/21.02 |
| 2015/0103561 A1* | 4/2015 | Dai | H02M 3/33546 | 363/17 |
| 2015/0109824 A1* | 4/2015 | Chen | H02M 3/33576 | 363/17 |
| 2015/0124492 A1* | 5/2015 | Fu | H02M 3/33546 | 363/21.02 |
| 2015/0162840 A1* | 6/2015 | Frost | H02M 3/33573 | 363/21.02 |
| 2015/0180345 A1* | 6/2015 | Frost | H02M 3/3376 | 363/21.02 |
| 2015/0198634 A1* | 7/2015 | Brinlee | G01R 31/28 | 324/72.5 |
| 2015/0381064 A1* | 12/2015 | Matsubara | H02M 3/33584 | 363/17 |
| 2016/0294294 A1* | 10/2016 | Ye | H02M 3/33592 | |
| 2016/0365795 A1* | 12/2016 | Madsen | H02M 3/33523 | |
| 2018/0083545 A1* | 3/2018 | Vijayan | H02M 7/4826 | |
| 2018/0294674 A1* | 10/2018 | Choi | B60L 53/12 | |
| 2019/0068071 A1* | 2/2019 | Jia | H02M 3/3376 | |
| 2019/0115830 A1* | 4/2019 | Giuliano | H02M 3/158 | |
| 2019/0267886 A1* | 8/2019 | Hung | H02M 1/08 | |
| 2019/0296650 A1* | 9/2019 | Wang | H02M 3/01 | |
| 2019/0393769 A1* | 12/2019 | Wei | H02M 3/33592 | |
| 2020/0287468 A1* | 9/2020 | Mizutani | H02M 7/53871 | |
| 2021/0242786 A1* | 8/2021 | Deboy | H02M 3/33569 | |
| 2021/0408923 A1* | 12/2021 | Sun | H02M 3/33573 | |
| 2022/0255442 A1* | 8/2022 | Morrison | H02M 1/0048 | |
| 2024/0007008 A1* | 1/2024 | McLean | B60L 53/20 | |
| 2024/0014743 A1* | 1/2024 | Mukherjee | H02M 3/33573 | |
| 2024/0055996 A1* | 2/2024 | Cao | H02M 3/33576 | |
| 2024/0217358 A1* | 7/2024 | Wan | H02M 3/33584 | |
| 2024/0348159 A1* | 10/2024 | Shafer | H02M 3/33573 | |
| 2025/0047206 A1* | 2/2025 | Cao | H02M 1/007 | |

* cited by examiner

600

602

604

800

802

804

LOAD INDEPENDENT VOLTAGE AND CURRENT GAIN RESONANT TOPOLOGIES

BACKGROUND

Technical Field

Novel aspects of the present disclosure relate to power converters, and more particularly, to an improved power converter that can provide constant voltage or current irrespective of load changes.

Background

Power converters are devices that converts energy from an input form to an output form that is optimized for a particular load. For example, a power converter can be used to increase or decrease the magnitude of the input voltage, invert polarity, or produce several output voltages of either the same polarity with the input, different polarity, or mixed polarities.

Some power converters are designed to provide constant voltage (CV). Typically, the constant voltage converter includes a control loop to adjust the duty cycle to maintain a constant voltage output regardless of changes to the input voltage and load current.

Some power converters are designed to provide constant current (CC). The constant current converter also includes a control loop that adjusts the duty cycle to maintain constant output current regardless of changes to the input voltage and load resistance. For example, higher load resistance results in greater output voltage.

SUMMARY OF THE INVENTION

Novel aspects of the present invention are directed to a resonant converter that includes an input stage, an output stage, and a resonant network stage that includes at least one inductor and at least one capacitor. The resonant network stage is electrically coupled between the input stage and the output stage and configured to provide a constant current gain at a first operating frequency and a constant voltage gain at a second operating frequency that differs from the first operating frequency. The output stage is configured to be electrically coupled to a load having either a constant current or constant voltage operating mode, or both, and the resonant network provides the constant current, or the constant voltage based on a control signal generated by a frequency modulator for switching between the first operating frequency and the second operating frequency.

In another embodiment, novel aspects of the present invention are directed to an apparatus that includes a resonant converter, a load, and a frequency modulator. The resonant converter includes an input stage, an output stage, and a resonant network stage that includes at least one inductor and at least one capacitor. The resonant network stage is electrically coupled between the input stage and the output stage and configured to provide a constant current gain at a first operating frequency and a constant voltage gain at a second operating frequency that differs from the first operating frequency. The output stage is configured to be electrically coupled to a load having either a constant current or constant voltage operating mode, or both, and the resonant network provides the constant current, or the constant voltage based on a control signal generated by a frequency modulator for switching between the first operating frequency and the second operating frequency. The load is attached to the output stage of the resonant converter and has a first operating mode requiring the constant current and a second operating mode requiring the constant voltage. A frequency modulator is attached to the resonant converter and configured to switch between the first operating frequency and the second operating frequency to provide the load with the constant current and the constant voltage.

In yet another embodiment, novel aspects of the present invention are directed to a method of power conversion that includes receiving, at an input stage, a direct current (DC) voltage. In this step, the input stage is operating at a first operating frequency providing an alternating current (AC) voltage to an input of a resonant network. The method also includes providing, at a resonant network stage operating with the AC voltage, a constant current gain or a constant voltage gain; generating, at an output stage electrically connected to a load having a first operating mode requiring a constant current and a second operating mode requiring a constant voltage, one of the constant current or the constant voltage. The method includes changing, at the input stage, from the first operating frequency to a second operating frequency, to provide the other of the constant current gain or the constant voltage gain at the second operating frequency; and generating, at the output stage for the load, the other of the constant current or the constant voltage.

Other aspects, embodiments, and features of the invention will become apparent from the following detailed description of the invention when considered in conjunction with the accompanying figures. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE FIGURES

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying figures, wherein:

DETAILED DESCRIPTION

CC/CV power converters attempt to regulate both current and voltage depending on the load requirement. These CC/CV power converters generally use two control loops to control output voltage or current. The power converter's ability to maintain constant voltage or current at the output terminals with changes in load depends on the performance of feedback control loop. In practice, control loop bandwidths are limited by several factors including the stability of operation at various load conditions. With a finite loop bandwidth and gain, CC/CV power converters lose its ability to operate as a true voltage or current source, particularly during load transients.

Some applications demand constant output voltage or current irrespective of fast load changes. Examples include laser diode drivers, magnet power supplies, and capacitor charging applications for constant current requirement. Some applications like battery charging require both CC and CV operation, e.g., during the charging phase and the float phase, respectively. Most of the high voltage capacitor charging power supplies that are used to charge a pulse forming network or a high voltage capacitor are operated in CC mode during the charge phase and in CV during the refresh phase. The charge and refresh modes are repeated as high as few kHz for certain applications. These applications benefit from a topology that can inherently provide constant current and constant voltage at the output without much dependence on the feedback control loop circuit.

Thus, novel aspects of this disclosure recognize the need for resonant converters that include resonant networks that can provide a constant current gain at a first operating frequency and a constant voltage gain at a second operating frequency. These improved resonant converters can be utilized for applications where the attached load requires different power requirements in different operational modes.

Figure 1:
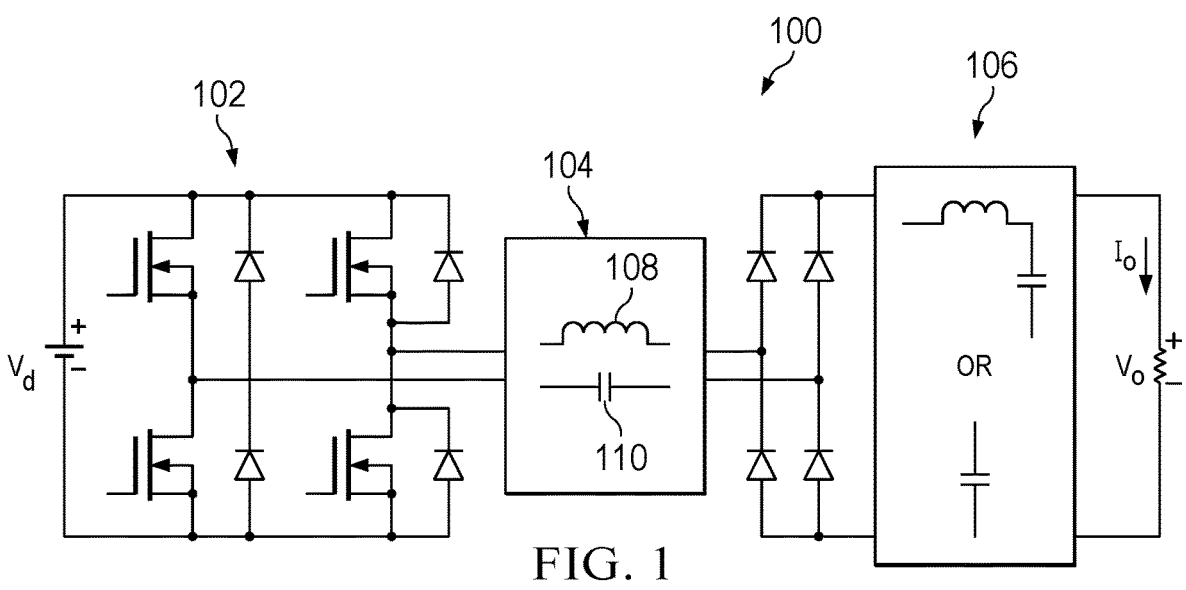
FIG. 1 is a schematic diagram of a resonant converter.

FIG. 1 is a schematic diagram of a resonant converter. The resonant converter 100 includes an input stage 102 and an output stage 106 connected by a resonant network 104. The resonant network 104 includes at least one inductor 108 and at least one capacitor 110.

Figure 2:
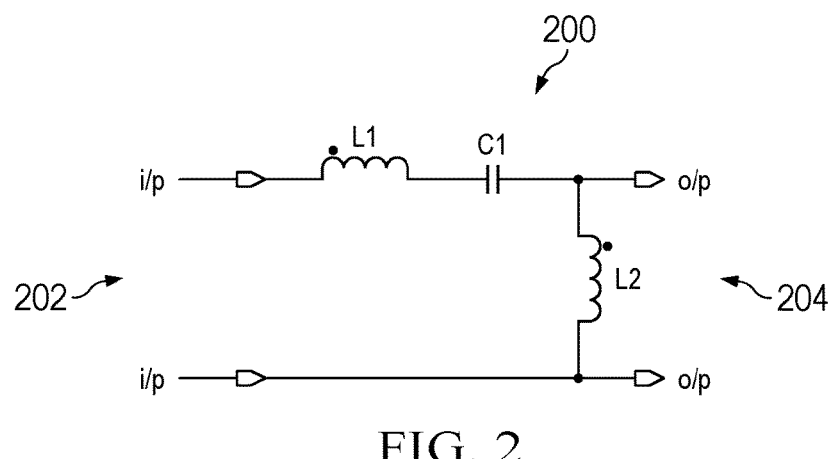
FIG. 2 is a schematic diagram of an LLC resonant network.

In the non-limiting embodiment depicted in FIG. 1, the input stage 102 is a full bridge inverter and the output stage 106 is an output rectifier. For applications that require a true voltage or current source, resonant power converter 100 can be configured to provide load independent voltage or current gain characteristics. Conventional power converters suffer from the inability to provide both constant voltage and constant current gain from input to output when operated at certain switching frequencies. For example, resonant network 200 from FIG. 2 is a common LLC resonant network that can be incorporated into the resonant converter 100 in place of resonant network 104 to provide a constant voltage resonant converter, as described in more detail in FIG. 3 that follows. Resonant network 400 from FIG. 4 is a common LC resonant network that can be incorporated into the resonant converter 100 in place of resonant network 104 to provide a constant current resonant converter, as described in more detail in FIG. 5 that follows.

Figure 4:
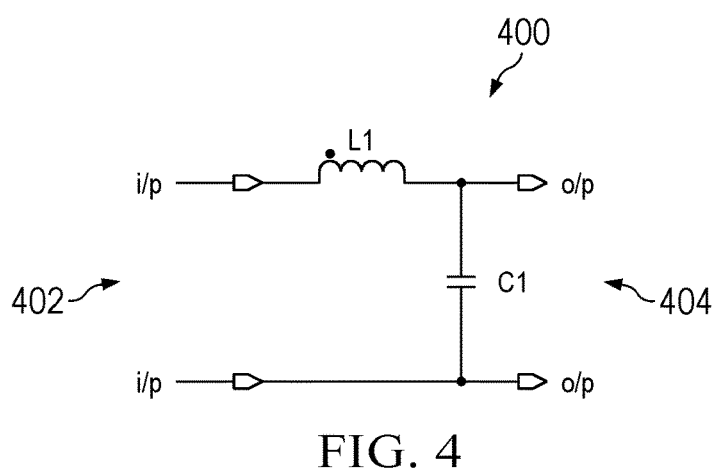
FIG. 4 is a schematic diagram of a parallel resonant network.

In contrast to the conventionally implemented resonant networks shown in FIGS. 2 and 4, certain other resonant network stages can be selected to provide a constant current gain at a first operating frequency and a constant voltage gain at a second operating frequency that differs from the first operating frequency, as described in more detail in FIGS. 6 through 9.

Circuit parameters for the various resonant networks depicted in this disclosure can be determined by the following equations:

Resonant frequency, $$\omega_0 = \frac{1}{\sqrt{L_1 C_1}} \tag{1}$$

Quality factor, $$Q = \frac{\omega_0 L}{R_L} \tag{2}$$

Characteristic impedance, $$Z_n = \sqrt{\frac{L_1}{C_1}} \tag{3}$$

$$\text{Voltage Gain} = \frac{V_0}{V_d} \tag{4}$$

$$\text{Current Gain} = \frac{I_0}{V_d/Z_n} \tag{5}$$

In equation (2), $R_L$ represents the Load Resistor connected at the output of the rectifier stage shown in FIG. 1, and Q represents the change of load resistor $R_L$.

FIG. 2 is a schematic diagram of an LLC resonant network. When incorporated into a resonant converter, such as resonant converter 100 in FIG. 1, the input 202 of the resonant network 200 is connected to the output of the input stage 102, and the output 204 of the resonant network 200 is connected to the input of the output stage 106.

Figure 3:
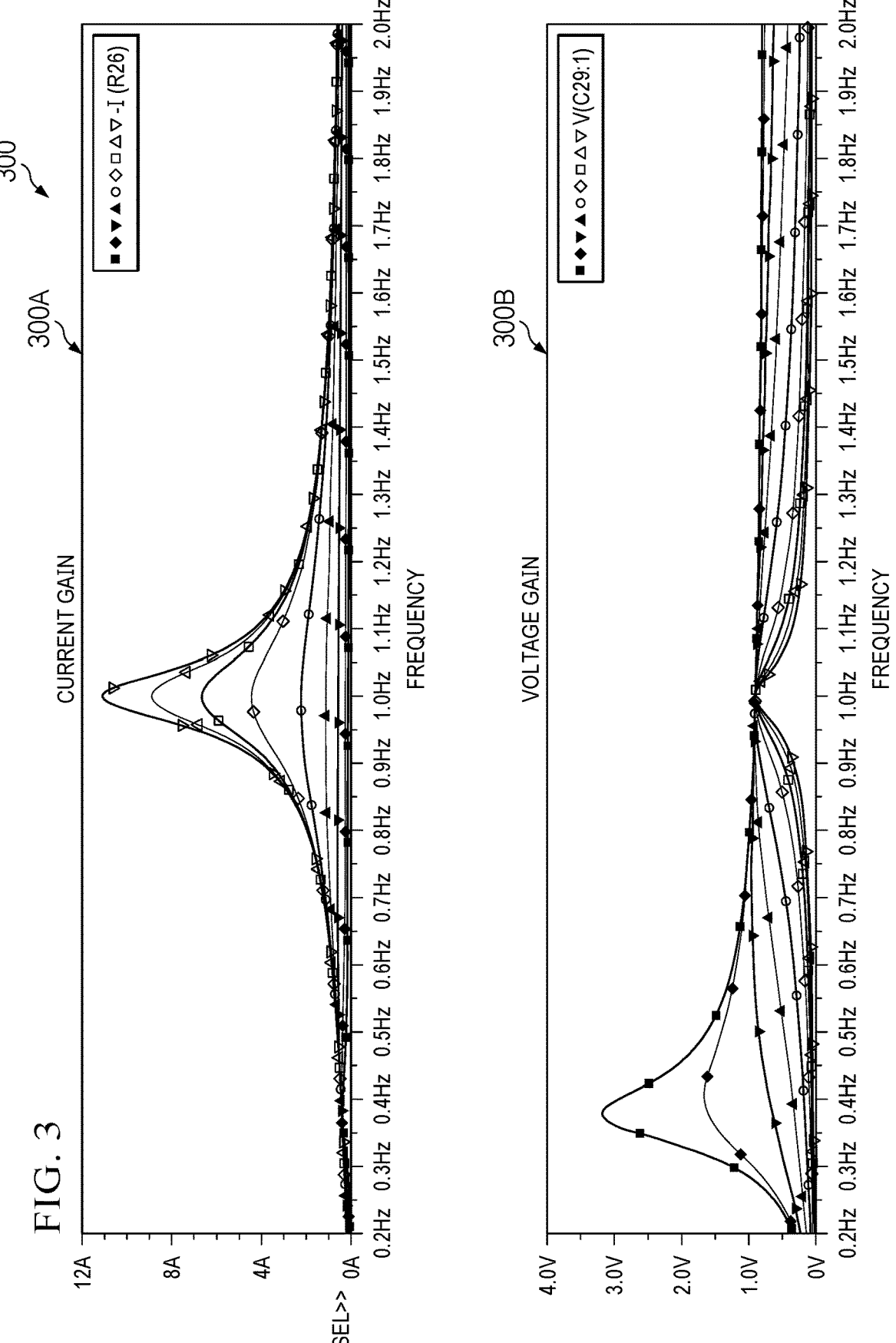
FIG. 3 depicts exemplary waveforms illustrating current gain and voltage gain of the LLC resonant network of FIG. 2.

Voltage gain and current gain of resonant converter 100 configured with resonant network 200 at the location of resonant network 104 are shown in FIG. 3 for various output load conditions (Q=0.1 to 10).

FIG. 3 depicts exemplary waveforms illustrating current gain and voltage gain of the LLC resonant network of FIG. 2 when incorporated in resonant network 100. From the current gain waveform 300A and the voltage gain waveform 300B, it can be seen that operation of the power converter 100 at the resonant frequency of L1 and C1, i.e., $W_0$=1 Hz, the output voltage can be maintained constant irrespective of load value. This property of the circuit combined with inductive nature of the total impedance seen by the inverter switches, when operated around the resonant frequency is useful for designing fixed output voltage converters.

FIG. 4 is a schematic diagram of an LC resonant network. When incorporated into a resonant converter, such as resonant converter 100 in FIG. 1, the input 402 of the resonant network 400 is connected to the output of input stage 102, and the output 404 of the resonant network 400 is connected to the input of the output stage 106.

Figure 5:
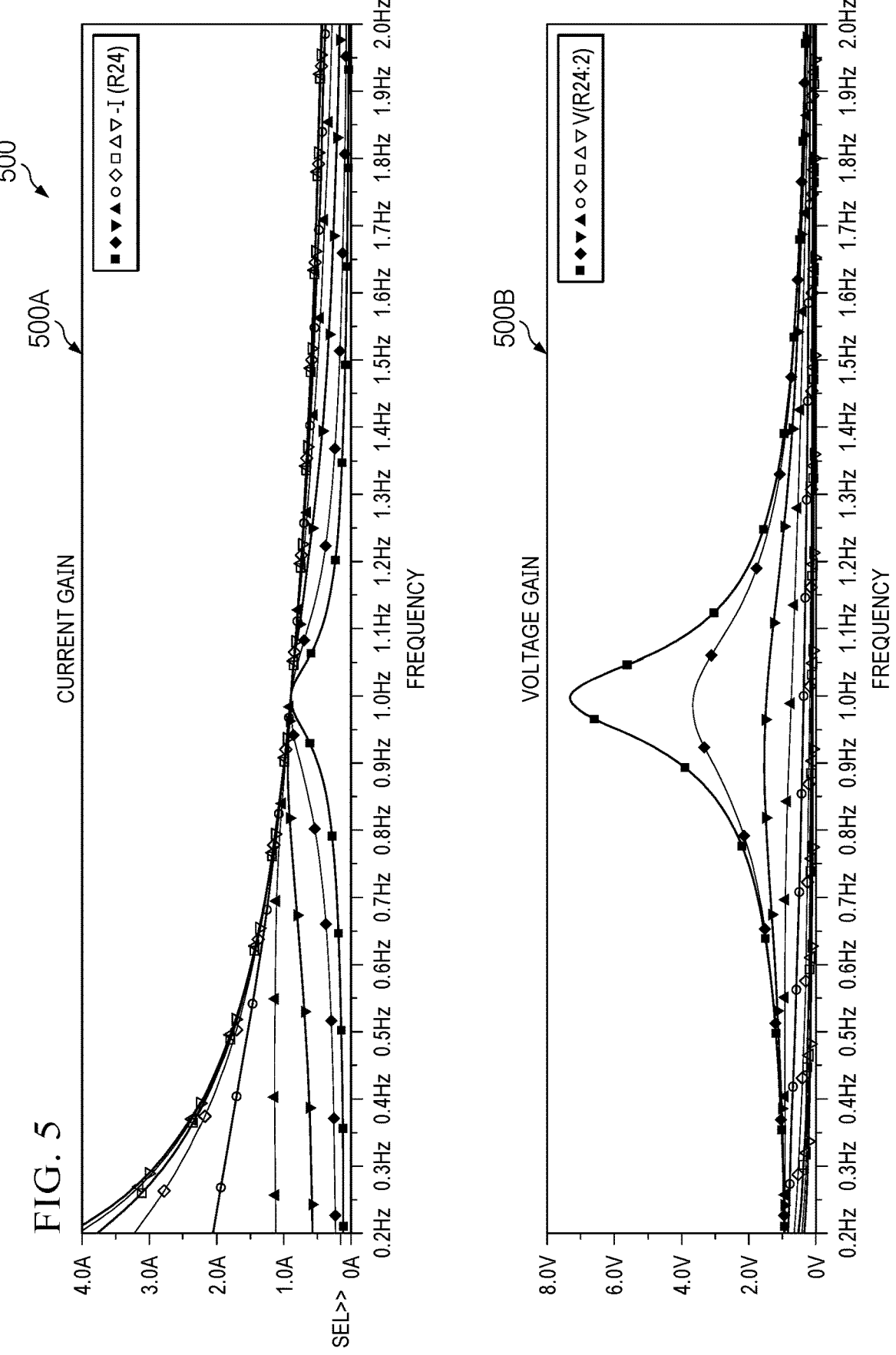
FIG. 5 depicts exemplary waveforms illustrating current gain and voltage gain of the parallel resonant network of FIG. 4.

Voltage gain and current gain of resonant converter 100 configured with resonant network 400 at the location of resonant network 104 are shown in FIG. 5 for various output load conditions (Q=0.1 to 10).

FIG. 5 depicts exemplary waveforms illustrating current gain and voltage gain of the parallel resonant network of FIG. 4 when incorporated in resonant network 100. From the current gain waveform 500A and the voltage gain waveform 500B, it can be seen that operation of the power converter 100 at the resonant frequency of L1 and C1, i.e., $W_O$=1 Hz, the output current can be maintained constant irrespective of load value. This property of the circuit combined with inductive nature of the total impedance seen by the inverter switches, when operated around the resonant frequency is useful for designing fixed output current converters.

As can be seen, the resonant network 200 can be used to provide constant voltage whereas the resonant network 400 can be implemented to provide constant current. However, neither can be used to provide a CC/CV resonant converter.

Figure 6:
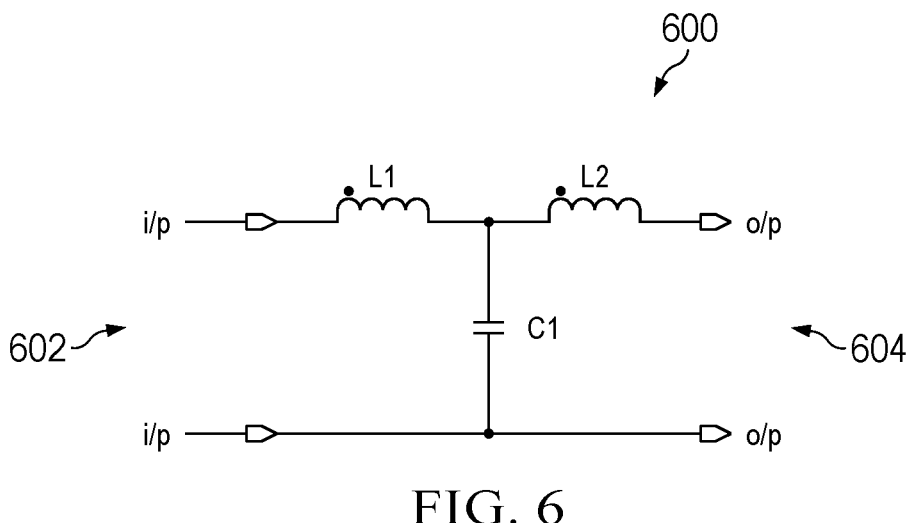
FIG. 6 is a schematic diagram of a LCL resonant network.

FIG. 6 is a schematic diagram of a LCL resonant network. When incorporated into a resonant converter, such as resonant converter 100 in FIG. 1, the input 602 of the resonant network 600 is connected to the output of input stage 102, and the output 604 of the resonant network 600 is connected to the input of the output stage 106.

Figure 7:
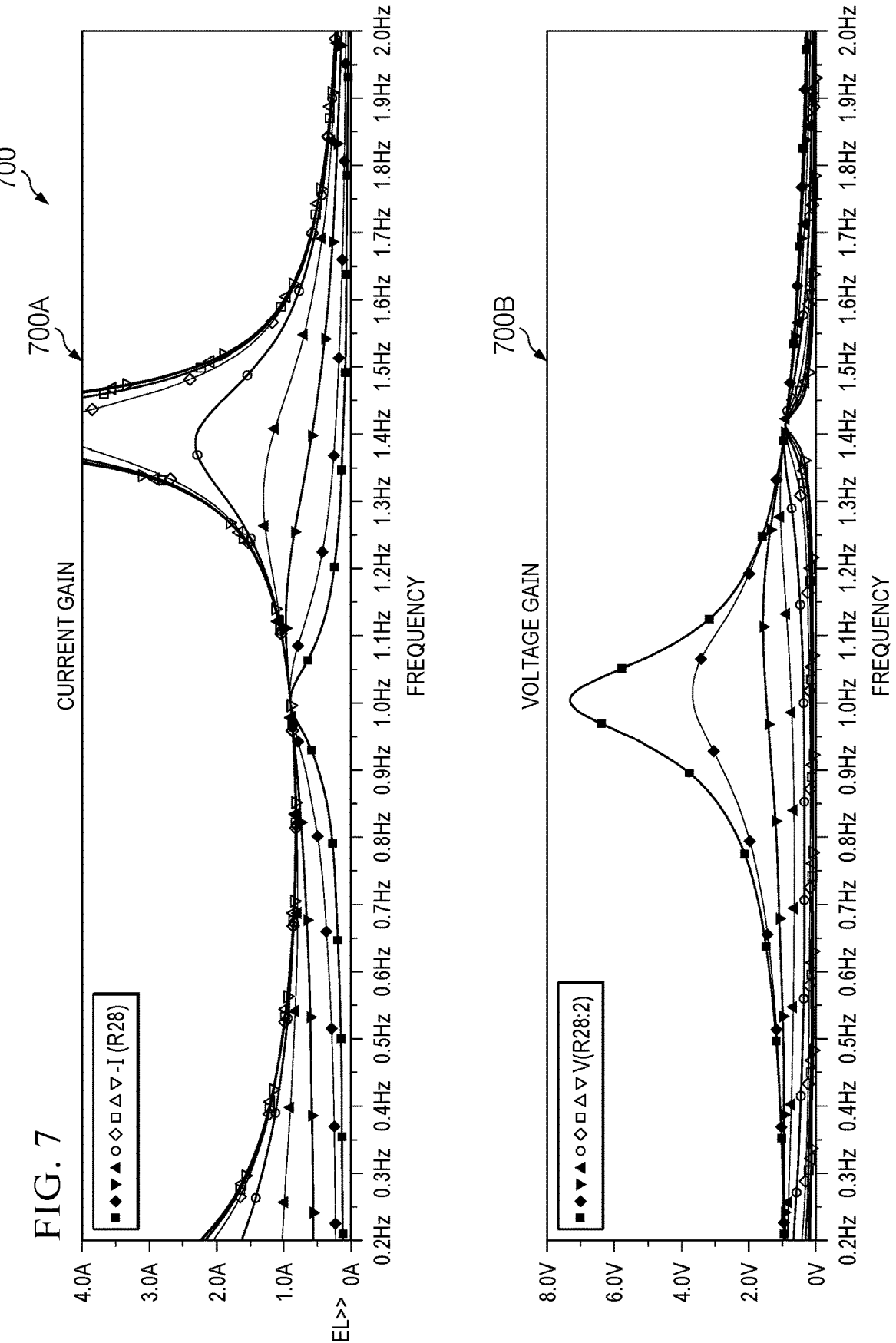
FIG. 7 depicts exemplary waveforms illustrating current gain and voltage gain of the LCL resonant network in FIG. 6.

Voltage gain and current gain of resonant converter 100 configured with resonant network 600 at the location of resonant network 104 are shown in FIG. 7 for various output load conditions (Q=0.1 to 10).

FIG. 7 depicts exemplary waveforms illustrating current gain and voltage gain of the LCL resonant network in FIG. 6. From the current gain waveform 700A and the voltage gain waveform 700B, it can be seen that operation of the power converter 100 at the resonant frequency of L1 and C1, i.e., $W_O$=1 Hz, the output current can be maintained constant irrespective of load value. Additionally, at the resonant frequency of 1.414 times the resonant frequency, i.e., 1.414*$W_O$, the power converter 100 can provide an output voltage that is constant irrespective of load value. Thus, a power converter 100 with resonant network 600 can be operated as a CV/CC power converter with phase shift control/bus voltage control.

Figure 8:
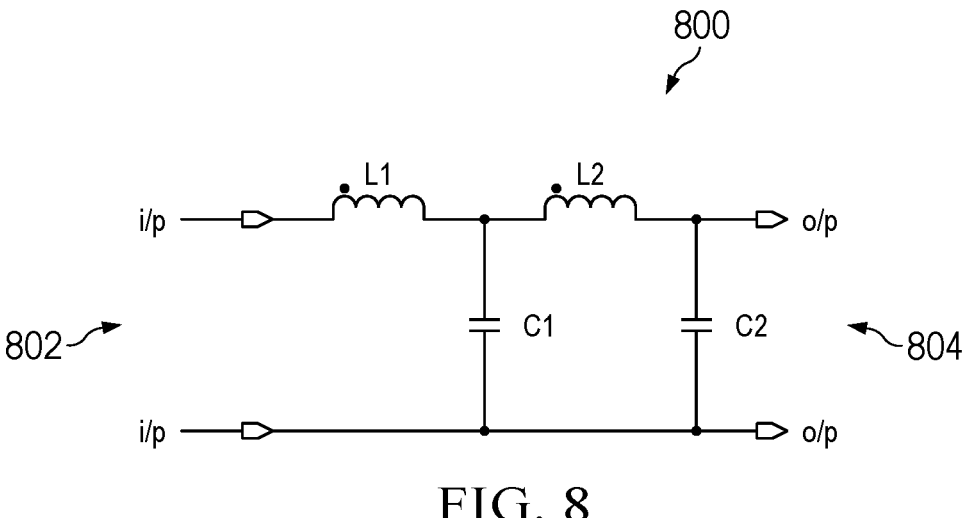
FIG. 8 is a schematic diagram of a LCLC resonant network.

FIG. 8 is a schematic diagram of a LCLC resonant network. When incorporated into a resonant converter, such as resonant converter 100 in FIG. 1, the input 802 of the resonant network 800 is connected to the output of input stage 102, and the output 804 of the resonant network 800 is connected to the input of the output stage 106.

Figure 9:
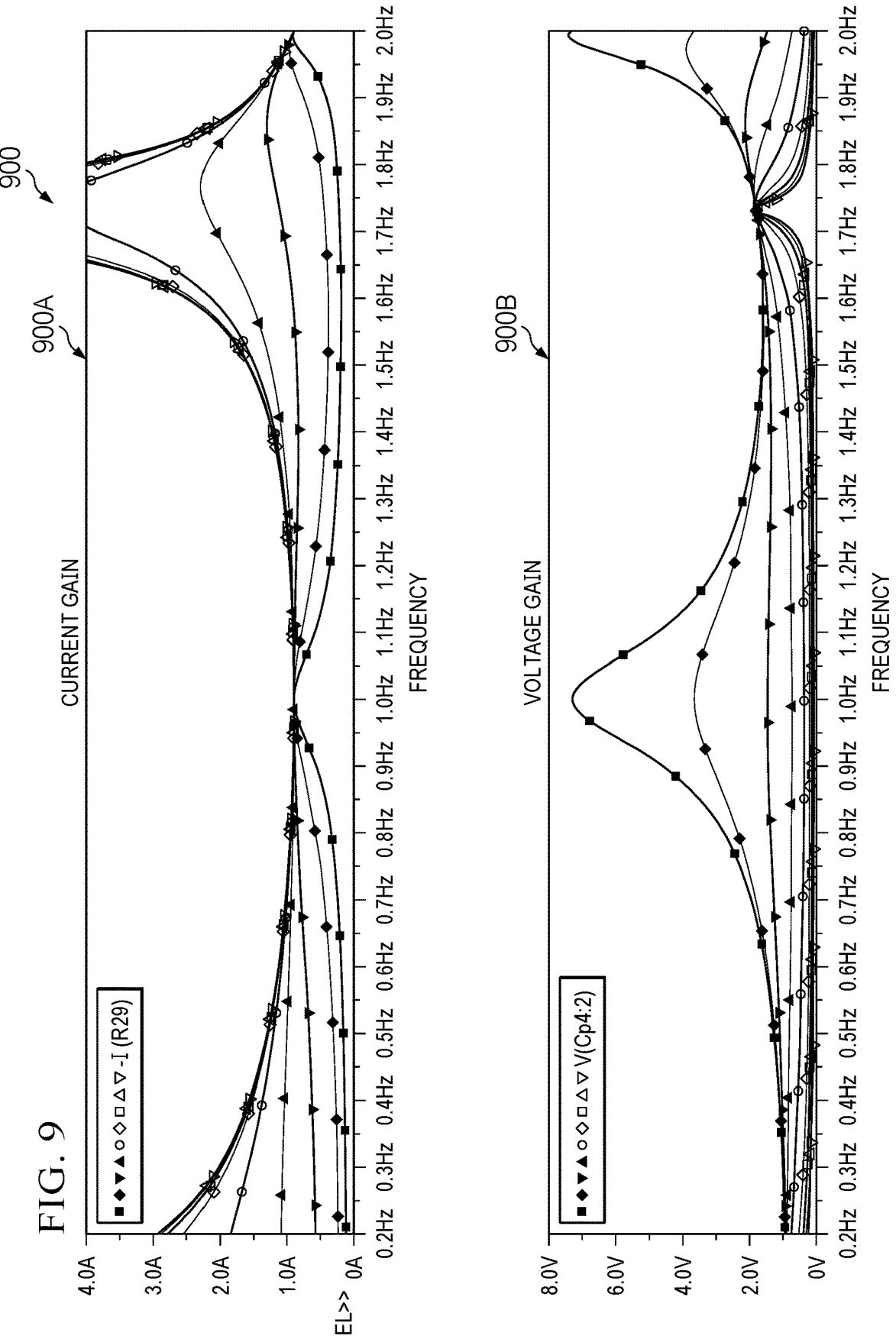
FIG. 9 depicts exemplary waveforms illustrating current gain and voltage gain of the LCLC resonant network in FIG. 8.

Voltage gain and current gain of resonant converter 100 configured with resonant network 800 at the location of resonant network 104 are shown in FIG. 9 for various output load conditions (Q=0.1 to 10).

FIG. 9 depicts exemplary waveforms illustrating current gain and voltage gain of the LCLC resonant network in FIG. 8. From the current gain waveform 900A and the voltage gain waveform 900B, it can be seen that operation of the power converter 100 at the resonant frequency of L1 and C1, i.e., $W_O$=1 Hz, the output current can be maintained constant irrespective of load value. Additionally, at the resonant frequency of 1.73 times the resonant frequency, i.e., 1.73*$W_O$, the power converter 100 can provide an output voltage that is constant irrespective of load value. Thus, a power converter 100 with resonant network 800 can be operated as a CV/CC power converter with phase shift control/bus voltage control.

Figures 10, 11:
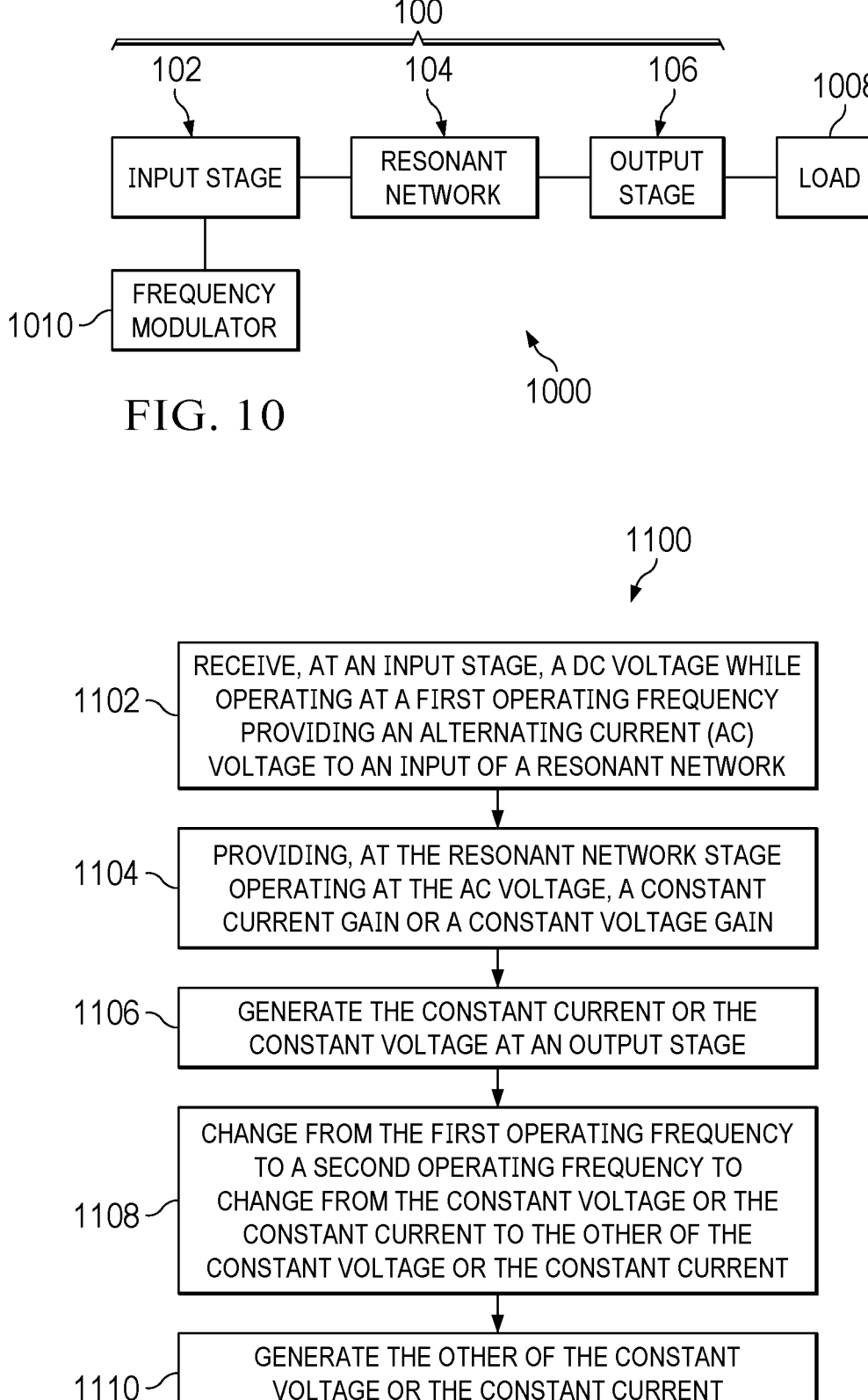
FIG. 10 is a schematic diagram of an apparatus providing constant current gain and constant voltage gain according to an illustrative embodiment.
FIG. 11 is a flowchart of a process for operating an improved resonant converter to provide constant current operating mode and a constant voltage operating mode in accordance with an illustrative embodiment.

FIG. 10 is a schematic diagram of an apparatus providing constant current gain and constant voltage gain according to an illustrative embodiment. The apparatus 1000 includes a resonant converter 100 that is configured to pass a constant current gain or constant voltage gain from the input stage 102 and through the output stage 106.

As previously described, the apparatus 1000 includes a resonant converter 100 that includes an input stage 102 connected to an output stage 106 by a resonant network 104. The resonant network 104 includes at least one inductor and at least one capacitor (not shown) and in some embodiments the input stage includes a bridge inverter and the output stage includes a rectifier. The resonant network 104 provides a constant current at a first operating frequency and a constant voltage at a second operating frequency that differs from the first operating frequency.

In some embodiments, the impedance at the input stage is inductive in nature around the operating frequency of the resonant network 104. Additionally, in one or more embodiments, the first operating frequency or the second operating frequency is a resonant frequency of the resonant network 104.

A load 1008 is attached to the output stage 106. The load 1008 has a first operating mode requiring the constant current and a second operating mode requiring the constant voltage. The load 1008 can be subjected to load changes when powered.

A frequency modulator 1010 is coupled with the input stage 102 to provide a control signal that causes the resonant converter 100 to switch between the first operating frequency and the second operating frequency to provide the load 1008 with the constant current and the constant voltage.

In one embodiment of the apparatus 1000, the load 1008 is a high-voltage capacitor, the first operating mode is a charging phase of the high-voltage capacitor, and the second operating mode is a refresh phase of the high-voltage capacitor.

In another embodiment of the apparatus 1000, the load 1008 is a battery, the first operating mode is a charging phase of the battery, and the second operating mode is a refresh phase of the battery.

FIG. 11 is a flowchart of a process for operating an improved resonant converter to provide constant current operating mode and a constant voltage operating mode in accordance with an illustrative embodiment. The steps of flowchart 1100 can be implemented in a resonant converter, such as resonant converter 100 in FIG. 1 configured with a resonant network that can provide constant current at a first operating frequency and constant voltage at a second operating frequency. In a non-limiting embodiment, the first operating frequency or the second operating frequency is a resonant frequency of the resonant network.

Flowchart 1100 begins at step 1102 by receiving, at the input stage, a direct current (DC) voltage. In a non-limiting embodiment, the input stage is operating at a first operating frequency providing an alternating current (AC) voltage to the input of the resonant network.

In step 1104, a resonant network stage operating with the alternating current (AC) voltage provides a constant current gain or a constant voltage gain. In a non-limiting embodiment, the resonant network stage comprises at least one inductor and at least one capacitor.

In step 1106, the constant current or the constant voltage is generated at an output stage that is electrically connected to a load having a first operating mode requiring a constant current and a second operating mode requiring a constant voltage.

In step 1108, the first operating frequency is changed at the input stage to a second operating frequency so that the constant current gain or the constant voltage gain at the first operating frequency is changed to the other of the constant current gain or the constant voltage gain. In some embodiments, a control signal transmitted from a frequency modulator initiates the changing step.

In step 1110, the other of the constant current or the constant current is generated at the output stage for the load.

In a non-limiting embodiment, the load is a high-voltage capacitor, the first operating mode is a charging phase of the high-voltage capacitor, and the second operating mode is a refresh phase of the high-voltage capacitor.

In another non-limiting embodiment, the load is a battery, the first operating mode is a charging phase of the high-voltage capacitor, and the second operating mode is a refresh phase of the high-voltage capacitor.

In one or more embodiments, the input stage includes a bridge inverter, and the output stage includes a rectifier.

Additional Embodiments

The following descriptive embodiments are offered in further support of the disclosed invention:

In a first embodiment, novel aspects of the present disclosure are directed to an improved resonant converter that includes an input stage, an output stage, and a resonant network stage that includes at least one inductor and at least one capacitor. The resonant network stage is electrically coupled between the input stage and the output stage and configured to provide a constant current gain at a first operating frequency and a constant voltage gain at a second operating frequency that differs from the first operating frequency. The output stage is configured to be electrically coupled to a load having either a constant current or constant voltage operating mode, or both, and the resonant network provides the constant current, or the constant voltage gain based on a control signal generated by a frequency modulator for switching between the first operating frequency and the second operating frequency.

In another aspect of the first embodiment, the improved resonant converter includes an input stage, an output stage, and a resonant network stage that includes at least one inductor and at least one capacitor. The resonant network stage is electrically coupled between the input stage and the output stage and configured to provide a constant current gain at a first operating frequency and a constant voltage gain at a second operating frequency that differs from the first operating frequency. The output stage is configured to be electrically coupled to a load having either a constant current or constant voltage operating mode, or both, and the resonant network provides the constant current, or the constant voltage gain based on a control signal generated by a frequency modulator for switching between the first operating frequency and the second operating frequency. The resonant converter also includes one or more limitations selected from the following list:

wherein the impedance at the input stage is inductive in nature around a resonant frequency of the resonant network stage;

wherein the load is subject to load changes;

wherein the constant current gain and the constant voltage gain are each passed from the input stage and through the output stage;

wherein the load is a high-voltage capacitor, the first operating mode is a charging phase of the high-voltage capacitor, and the second operating mode is a refresh phase of the high-voltage capacitor;

wherein the load is a battery, the first operating mode is a charging phase of the battery, and the second operating mode is a refresh phase of the battery;

wherein the input stage includes a bridge inverter, and the output stage includes a rectifier; and/or wherein the first operating frequency or the second operating frequency is a resonant frequency of the resonant network.

In a second embodiment, novel aspects of the present disclosure are directed to an apparatus that includes a resonant converter, a load, and a frequency modulator. The resonant converter includes an input stage, an output stage, and a resonant network stage that includes at least one inductor and at least one capacitor. The resonant network stage is electrically coupled between the input stage and the output stage and configured to provide a constant current gain at a first operating frequency and a constant voltage gain at a second operating frequency that differs from the first operating frequency. The output stage is configured to be electrically coupled to a load having either a constant current or constant voltage operating mode, or both, and the resonant network provides the constant current, or the constant voltage gain based on a control signal generated by a frequency modulator for switching between the first operating frequency and the second operating frequency. The load is attached to the output stage of the resonant converter and has a first operating mode requiring the constant current and a second operating mode requiring the constant voltage. A frequency modulator is attached to the resonant converter and configured to switch between the first operating frequency and the second operating frequency to provide the load with the constant current and the constant voltage.

In another aspect of the second embodiment, the apparatus that includes a resonant converter, a load, and a frequency modulator. The resonant converter includes an input stage, an output stage, and a resonant network stage that includes at least one inductor and at least one capacitor. The resonant network stage is electrically coupled between the input stage and the output stage and configured to provide a constant current gain at a first operating frequency and a constant voltage gain at a second operating frequency that differs from the first operating frequency. The output stage is configured to be electrically coupled to a load having either a constant current or constant voltage operating mode, or both, and the resonant network provides the constant current, or the constant voltage gain based on a control signal generated by a frequency modulator for switching between the first operating frequency and the second operating frequency. The load is attached to the output stage of the resonant converter and has a first operating mode requiring the constant current and a second operating mode requiring the constant voltage. A frequency modulator is attached to the resonant converter and configured to switch between the first operating frequency and the second operating frequency to provide the load with the constant current and the constant voltage. The apparatus further comprises one or more limitations selected from the following list:

wherein the impedance at the input stage is inductive in nature around the operating frequency of the resonant network stage;

wherein the load is subject to load changes when powered;

wherein the constant current gain and the constant voltage gain are each passed from the input stage and through the output stage;

wherein the load is a high-voltage capacitor, the first operating mode is a charging phase of the high-voltage capacitor, and the second operating mode is a refresh phase of the high-voltage capacitor;

wherein the load is a battery, the first operating mode is a charging phase of the battery, and the second operating mode is a refresh phase of the battery;

wherein the first operating mode is a constant voltage operating mode, and the second operating mode is a constant current operating mode; and wherein the first operating frequency or the second operating frequency is a resonant frequency of the resonant network.

In a third embodiment, novel aspects of the present disclosure are directed to a method for power conversion that includes receiving, at an input stage, a direct current (DC) voltage. In this step, the input stage is operating at a first operating frequency providing an alternating current (AC) voltage to the input of the resonant network. The method also includes providing, at a resonant network stage operating with the AC voltage, a constant current gain or a constant voltage gain; generating, at an output stage electrically connected to a load having a first operating mode requiring a constant current and a second operating mode requiring a constant voltage, one of the constant current or the constant voltage. The method includes changing, at the input stage, from the first operating frequency to a second operating frequency, to provide the other of the constant current gain or the constant voltage gain at the second operating frequency; and generating, at the output stage for the load, the other of the constant current or the constant voltage.

In another aspect of the third embodiment, the method for power conversion that includes receiving, at an input stage, a direct current (DC) voltage. In this step, the input stage is operating at a first operating frequency providing an alternating current (AC) voltage to the input of the resonant network. The method also includes providing, at a resonant network stage operating with the AC voltage, a constant current gain or a constant voltage gain; generating, at an output stage electrically connected to a load having a first operating mode requiring a constant current and a second operating mode requiring a constant voltage, one of the constant current or the constant voltage. The method includes changing, at the input stage, from the first operating frequency to a second operating frequency, to provide the other of the constant current gain or the constant voltage gain at the second operating frequency; and generating, at the output stage for the load, the other of the constant current or the constant voltage; and wherein the method further comprises one or more limitations selected from the following list:

wherein the load is a high-voltage capacitor, the first operating mode is a charging phase of the high-voltage capacitor, and the second operating mode is a refresh phase of the high-voltage capacitor;

wherein the load is a battery, the first operating mode is a charging phase of the high-voltage capacitor, and the second operating mode is a refresh phase of the high-voltage capacitor; and wherein changing from the first operating frequency to the second operating frequency further comprises transmitting a control signal from a frequency modulator to initiate the changing step.

Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. For example, only two exemplary resonant network topologies are described in detail in this disclosure for providing CC/CV at different operating frequencies; however, the novel aspects of this disclosure can be provided by other resonant topologies that can also provide CC/CV at different operating frequencies. Additionally, these teachings could be implemented in one or more hybrid buck converters and other available step-up and step-down power converter topologies. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A resonant converter comprising:

an input stage;

an output stage; and a resonant network stage without magnetically coupled resonant inductors, the resonant network stage comprising at least one inductor and at least one capacitor, wherein the resonant network stage is electrically coupled between the input stage and the output stage, wherein the resonant network stage provides a constant current gain at a first operating frequency and wherein the resonant network stage provides a constant voltage gain at a second operating frequency that differs from the first operating frequency, wherein:

the output stage is configured to be electrically coupled to a load having either a constant current operating mode or a constant voltage operating mode, or both, the resonant network stage provides the constant current gain or the constant voltage gain based on a control signal generated by a frequency modulator for switching between the first operating frequency and the second operating frequency, the first operating frequency is a resonant frequency of the at least one inductor and the at least one capacitor, the second operating frequency is between 1.27-1.90 times the resonant frequency, the load is a high-voltage capacitor, the constant current operating mode is a charging phase of the high-voltage capacitor, and the constant voltage operating mode is a refresh phase of the high-voltage capacitor.

2. The resonant converter of claim 1, wherein an impedance at the input stage is inductive in nature around a resonant frequency of the resonant network stage.

3. The resonant converter of claim 1, wherein the load is subject to load changes.

4. The resonant converter of claim 1, wherein the constant current gain and the constant voltage gain are each passed from the input stage and through the output stage.

5. The resonant converter of claim 1, wherein the first operating frequency or the second operating frequency is a resonant frequency of the resonant network stage.

6. An apparatus comprising:

a resonant converter including:

an input stage, an output stage, and a resonant network stage without magnetically coupled resonant inductors, the resonant network stage comprising at least one inductor and at least one capacitor, wherein:

the resonant network stage is electrically coupled between the input stage and the output stage, the resonant network stage provides a constant current gain at a first operating frequency, the resonant network stage provides a constant voltage gain at a second operating frequency that differs from the first operating frequency, the first operating frequency is a resonant frequency of the at least one inductor and the at least one capacitor, and the second operating frequency is between 1.27-1.90 times the resonant frequency;

a load attached to the output stage, wherein the load has a first operating mode requiring the constant current and a second operating mode requiring the constant voltage, wherein:

the load is a high-voltage capacitor, the first operating mode is a constant voltage operating mode, the first operating mode is a charging phase of the high-voltage capacitor, the second operating mode is a constant current operating mode, and the second operating mode is a refresh phase of the high-voltage capacitor; and a frequency modulator configured to switch between the first operating frequency and the second operating frequency to provide the load with the constant current gain and the constant voltage gain.

7. The apparatus of claim 6, wherein an impedance at the input stage is inductive in nature around an operating frequency of the resonant network stage.

8. The apparatus of claim 6, wherein the load is subject to load changes when powered.

9. The apparatus of claim 6, wherein the constant current gain and the constant voltage gain are each passed from the input stage and through the output stage.

10. The apparatus of claim 6, wherein the first operating frequency or the second operating frequency is a resonant frequency of the resonant network stage.

11. A method for power conversion, comprising:

receiving, at an input stage, a direct current (DC) voltage, wherein the input stage is operating at a first operating frequency providing an alternating current (AC) voltage to an input of a resonant network stage without magnetically coupled resonant inductors;

providing, at the resonant network stage operating with the AC voltage, a constant current gain or a constant voltage gain, wherein the resonant network stage comprises at least one inductor and at least one capacitor;

generating, at an output stage electrically connected to a load having a first operating mode requiring a constant current and a second operating mode requiring a constant voltage, one of the constant current or the constant voltage, wherein the load is a high-voltage capacitor, the first operating mode is a charging phase of the high-voltage capacitor, and the second operating mode is a refresh phase of the high-voltage capacitor;

changing, at the input stage, from the first operating frequency to a second operating frequency, wherein:

the input stage has the other of the constant current gain or the constant voltage gain at the second operating frequency, the first operating frequency is a resonant frequency of the at least one inductor and the at least one capacitor, the second operating frequency is between 1.27-1.90 times the resonant frequency, the changing step is initiated by a control signal transmitted from a frequency modulator; and generating, at the output stage for the load, the other of the constant current or the constant voltage.

* * * * *